(12) United States Patent
Mayhew et al.

(10) Patent No.: US 8,825,927 B2
(45) Date of Patent: Sep. 2, 2014

(54) SYSTEMS AND METHODS FOR MANAGING QUEUES

(75) Inventors: David E. Mayhew, Northborough, MA (US); Mark Hummel, Franklin, MA (US); Michael J. Osborn, Hollis, NH (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 45 days.

(21) Appl. No.: 13/602,725

(22) Filed: Sep. 4, 2012

(65) Prior Publication Data

US 2014/0068205 A1 Mar. 6, 2014

(51) Int. Cl.
*G06F 13/14* (2006.01)
(52) U.S. Cl.
USPC ................................ 710/53; 710/56; 710/33
(58) Field of Classification Search
None
See application file for complete search history.

(56) References Cited

U.S. PATENT DOCUMENTS

| | | | | |
|---|---|---|---|---|
| 4,616,359 A * | 10/1986 | Fontenot | ...................... | 370/230 |
| 5,541,912 A * | 7/1996 | Choudhury et al. | .......... | 370/412 |
| 5,566,175 A * | 10/1996 | Davis | ........................... | 370/468 |
| 5,692,156 A * | 11/1997 | Bahls et al. | .................... | 711/165 |
| 5,892,979 A * | 4/1999 | Shiraki et al. | .................. | 710/52 |
| 5,983,278 A * | 11/1999 | Chong et al. | .................... | 709/235 |
| 6,084,856 A * | 7/2000 | Simmons et al. | ............ | 370/235 |
| 6,246,687 B1 * | 6/2001 | Siu | .......................... | 370/395.71 |
| 6,510,161 B2 | 1/2003 | Trevitt et al. | | |
| 6,957,267 B2 * | 10/2005 | Awasthi | ........................ | 709/232 |
| 6,990,073 B1 * | 1/2006 | Sandoval | ...................... | 370/232 |
| 7,251,219 B2 * | 7/2007 | Lakshmanamurthy et al. | ............................. | 370/236 |
| 7,286,549 B2 * | 10/2007 | Gaur | ............................. | 370/412 |
| 7,417,986 B1 * | 8/2008 | Sandoval et al. | ............. | 370/381 |
| 7,568,074 B1 | 7/2009 | Kavipurapu et al. | | |
| 7,639,707 B2 * | 12/2009 | Haywood | ..................... | 370/429 |
| 7,769,016 B1 * | 8/2010 | Yeluri et al. | ................... | 370/394 |
| 7,882,285 B2 * | 2/2011 | Harding et al. | ................. | 710/56 |
| 7,925,802 B2 | 4/2011 | Lauterbach et al. | | |
| 8,085,803 B2 * | 12/2011 | Hoban | ......................... | 370/428 |
| 8,184,635 B2 * | 5/2012 | Wyatt | ............................ | 370/392 |
| 2003/0099195 A1 * | 5/2003 | Lee | ............................... | 370/229 |
| 2008/0320181 A1 | 12/2008 | Lauterbach et al. | | |
| 2009/0216920 A1 | 8/2009 | Lauterbach et al. | | |

OTHER PUBLICATIONS

Mayhew et al.; Patent Application for "Devices and Methods for Interconnecting Server Nodes", U.S. Appl. No. 13/526,973, filed Jun. 19, 2012.
David E. Mayhew; Patent Application for "Memory Switch for Interconnecting Server Nodes", U.S. Appl. No. 13/529,452, filed Jun. 21, 2012.
Hummel et al.; Patent Application for "Server Node Interconnect Devices and Methods"; U.S. Appl. No. 13/470,847, filed May 14, 2012.
Whelihan, David et al.; "Memory Optimization in Single Chip Network Switch Fabrics"; Department of Electrical Engineering; Carnegie Mellon University, Pittsburgh, PA; Jun. 10-14, 2002; 6 pages.

* cited by examiner

*Primary Examiner* — Cheng-Yuan Tseng
(74) *Attorney, Agent, or Firm* — Schmeiser, Olsen & Watts LLP

(57) ABSTRACT

Described are systems and methods for transmitting data at an aggregation device. The aggregation device includes a record queue and an output bypass queue. The data is received from an electronic device. A record is generated of the received data. The record is placed in the record queue. A determination is made that the record in the record queue is blocked. The blocked record is transferred from the record queue to the output bypass queue.

33 Claims, 9 Drawing Sheets

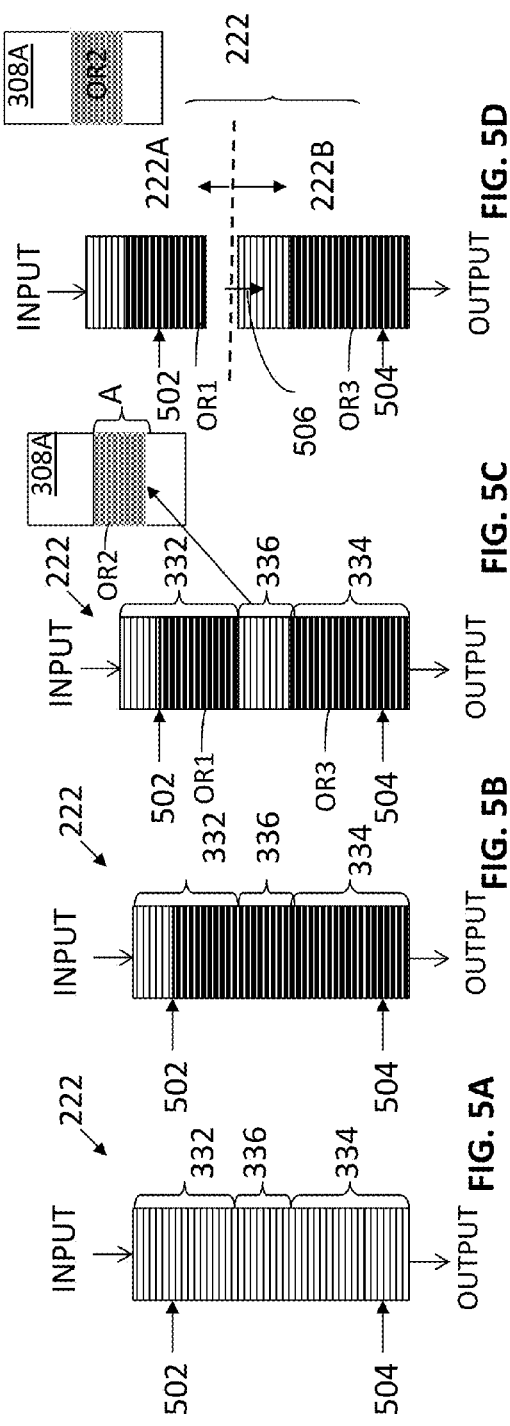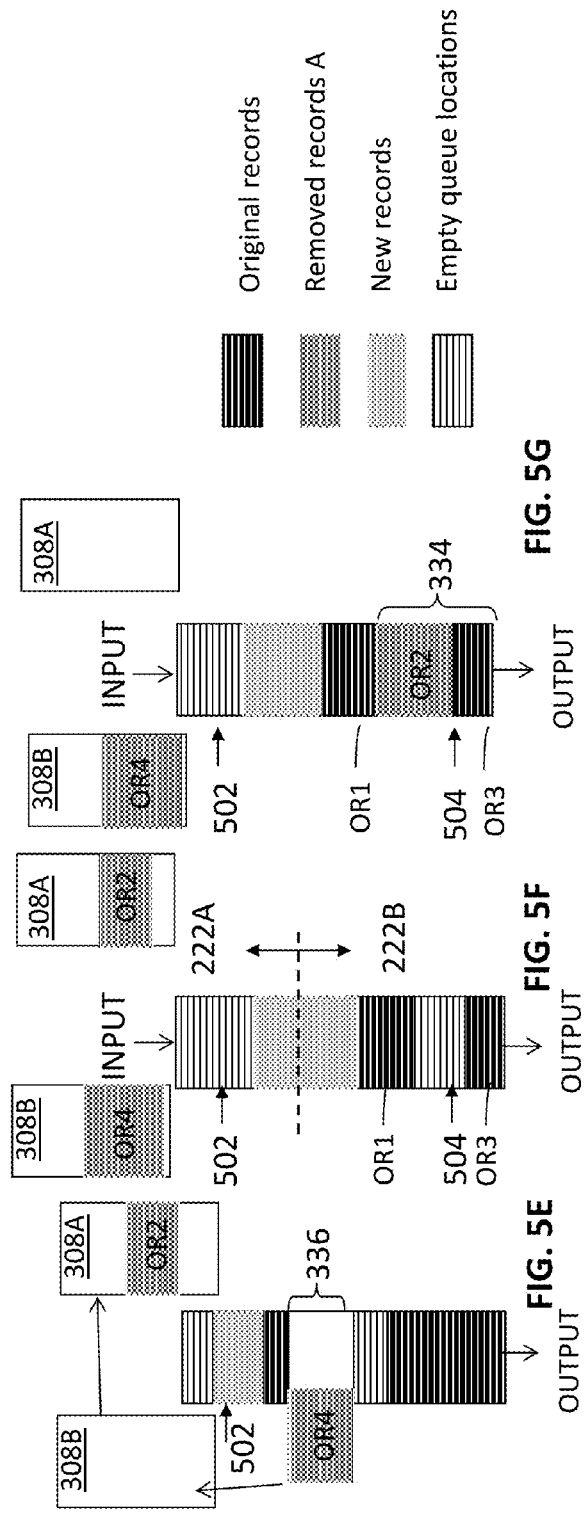

SYSTEMS AND METHODS FOR MANAGING QUEUES

FIELD OF THE INVENTION

The present invention relates generally to an electronic communication environment, and more specifically, to an aggregation system at an electronic communication environment having one or more queues that store data records.

BACKGROUND

Data centers are generally centralized facilities that provide Internet and/or intranet services supporting businesses and organizations. A typical data center can house various types of electronic equipment, such as computers, domain name system (DNS) servers, network switches, routers, and data storage devices. A typical data center can have thousands of interconnected servers communicating with each other and/or with external devices via a switching architecture comprising the electronic equipment. Conventional data centers can also be configured for virtualization, permitting servers and the like to share network interface cards (NICs), hard disk drives, or other hardware. A complex switch fabric can facilitate communications between the servers.

BRIEF SUMMARY OF EMBODIMENTS

In one aspect, there is provided a computer-implemented method for transmitting data at an aggregation device, comprising: receiving, at the aggregation device, data from an electronic device; placing a record of the received data in a record queue; and responsive to the record queue is at or higher than a first threshold, outputting a plurality of other records from locations in the record queue to a memory whereby a number of available locations at the record queue is increased.

In another aspect, there is provided a computer-implemented method for transmitting data at an aggregation device, comprising: receiving data from an electronic device in communication with the aggregation device; generating a record of the received data; placing a record of the received data in a record queue; and responsive to the record queue is blocked transferring the blocked record from the record queue to an output bypass queue.

In another aspect, there is provided an aggregation device that interconnects at least two server nodes, comprising: a record queue to temporarily stores a plurality of records generated from data received at the aggregation device from a source server node of the at least two server nodes prior to an output of the data to a destination server node of the at least two server nodes; and at least one output bypass queue that temporarily stores records that are blocked from output to the destination server node.

In another aspect, there is provided a computer program product, comprising: a computer readable storage medium having computer readable program code embodied therewith. The computer readable program code comprises computer readable program code configured to receive data from an electronic device; computer readable program code configured to generate a record of the received data; computer readable program code configured to place the record in a record queue; computer readable program code configured to determine that the record in the record queue is at or higher than a first threshold; and computer readable program code configured to transfer a plurality of other data records from locations in the record queue to a memory for increasing a number of available locations at the record queue.

In another aspect, there is provided a computer program product, comprising: a computer readable storage medium having computer readable program code embodied therewith. The computer readable program code comprises computer readable program code configured to include a record queue and an output bypass queue; computer readable program code configured to receive data from an electronic device; computer readable program code configured to generate a record of the received data; computer readable program code configured to place the record in the record queue; computer readable program code configured to determine that the record in the record queue is blocked; and computer readable program code configured to transfer the blocked record from the record queue to the output bypass queue.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIGS. 5A-5G are illustrations of a record queue processing data records in various stages of a data transfer operation at an aggregation system, in accordance with an embodiment;

DETAILED DESCRIPTION OF EMBODIMENTS

In the following description, specific details are set forth although it should be appreciated by one of ordinary skill that the systems and methods can be practiced without at least some of the details. In some instances, known features or processes are not described in detail so as not to obscure the present invention.

Figure 1:
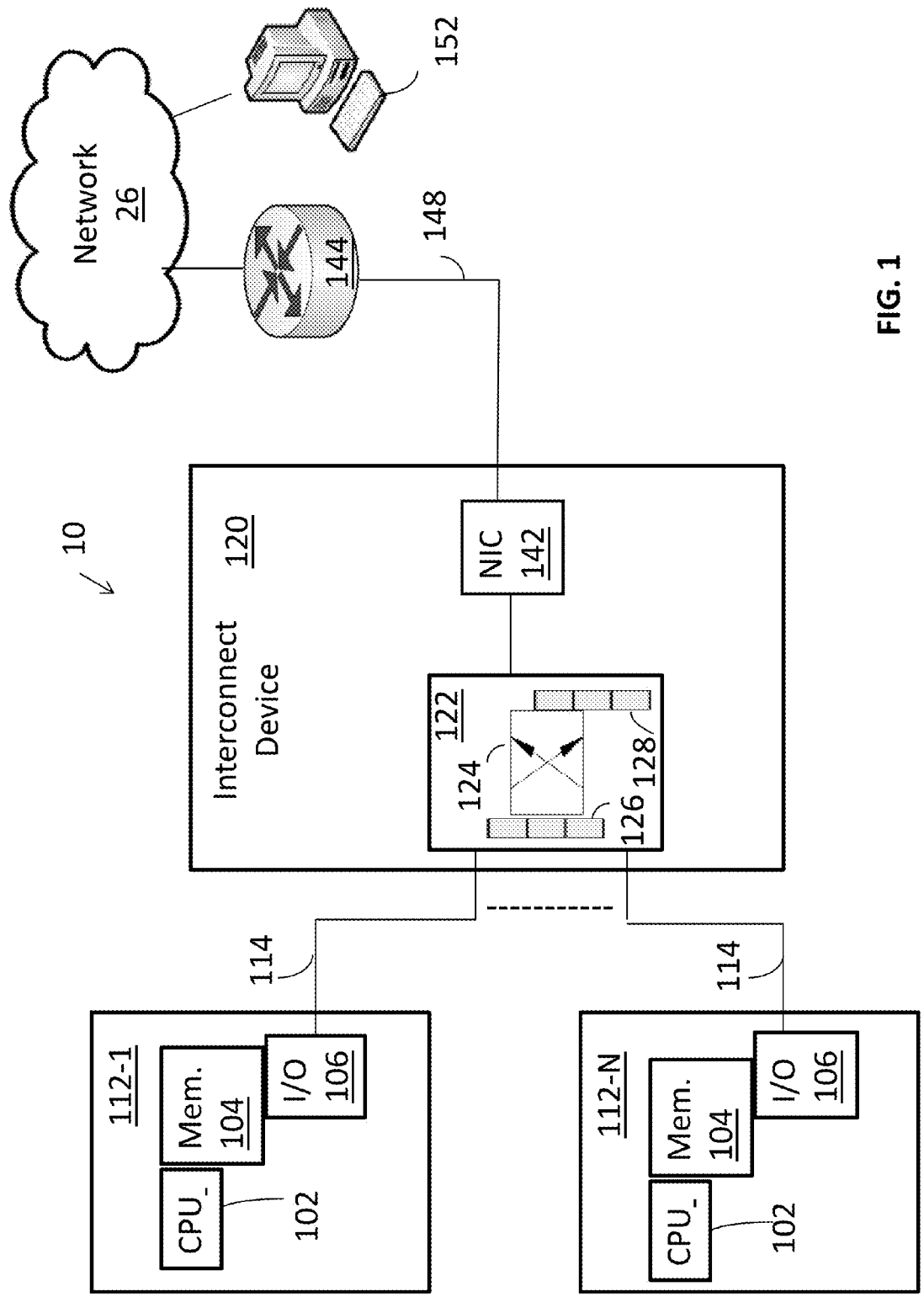
FIG. 1 is a block diagram of a data center including a plurality of server nodes coupled to an interconnect fabric device.

FIG. 1 is a block diagram of a data center 10 including a plurality of server nodes 112_1 through 112_N (N is an integer greater than 1) coupled to a conventional interconnect device 120. The interconnect device 120 can replace a number of aggregation switches and rack switches by aggregating the server nodes 112_1 through 112_N (generally, 112) at a single device.

The server nodes 112 can be single socket servers, processor nodes, or other low-power devices. Each server node 112 can include a processor 102. The processor 102 can include one or more microprocessors, central processing units (CPUs), graphics processing units (GPUs), digital signal processors (DSPs), application-specific integrated circuits (ASICs), memory controllers, multi-core processors, or other types of data processing devices, or portions and combinations of these and other devices.

A server node 112 can also include a local memory 104 and an I/O logic 106. The local memory 104 can be a non-volatile or volatile memory, for example, DRAM or static RAM (SRAM). The I/O logic 106 can be configured to include a southbridge or related I/O controller for managing data transfers between the server node 112 and the interconnect device 120, and for performing other computer I/O functions. The I/O logic 106 can include an Ethernet device driver, a Peripheral Component Interconnect Express (PCIe) connector, or other network connector for establishing a communication path 114 with the interconnect device 120.

The interconnect device 120 includes a multi-port switch fabric 122 that provides a plurality of data interconnections between the server nodes 112. In particular, the switch fabric 122 includes a plurality of input ports, a plurality of output ports and a crossbar 124 that can route variable or fixed length data packets, cells, and the like between the input and output ports, facilitating communication via one or more communication paths 114 between the server nodes 112 and/or shared devices such as a physical NIC 142. The NIC 142 can exchange data to/from the interconnect device 120 and a user computer 152 via a router 144, or an intelligent switch or related device, in communication with a network 26.

The crossbar 124 is constructed and arranged to include a plurality of conductive rows and columns that intersect each other so that data can be exchanged between rows and columns. The input ports can place data on the rows, and the output ports can receive data from the columns. Several input ports can each place data on a corresponding row.

To reduce the effects of congestion at the interconnect device 120, an input buffer 126 can be provided at the input ports of the crossbar 124 to temporarily store data received from the server nodes 112 until the crossbar 124 can deliver the data to an available output port. An output buffer 128 can be provided at the output ports for temporarily storing data received from one or more input ports until the desired output port is available for receiving data for transmission to a network bus 148, for example, an Ethernet bus.

The interconnect device 120 can be prone to congestion-related problems such as head-of-line (HOL) blocking, where a data packet at the head of a buffer queue waits for available resources at a destination server node, for example, due to unavailable receive buffers in a memory 104 at the server node 112, preventing data packets behind the packet at the head of the queue from being forwarded to their destinations until the packet at the head of the queue is cleared from the queue. A related issue is the inefficient use of bandwidth between the server nodes 112 and the interconnect device 120, which can occur from overrun or underrun conditions. For example, data can be "pushed" from a server node 112 to the interconnect device 120 regardless of the state of the input buffer 126. The data is typically dropped if the input buffer 126 is saturated. Large port configurations are particularly vulnerable, where the input and output buffers 126, 128 are often unable to keep up with the receipt of data from multiple input ports, resulting in undesirable latency, jitter, or packet loss.

Flow control and arbitration techniques can be implemented for mitigating network congestion at the data center 20. However, such techniques are typically complex and expensive to implement, and often have drawbacks. For example, Ethernet-based retransmissions consume valuable bandwidth at the switch. Some flow control techniques can be applied to an upstream device, requesting it to stop passing packets to the switch fabric 122. Complex scheduling algorithms and bus arbitration techniques are often implemented to manage data traffic through the crossbar 124 in order to further reduce congestion-related issues. Although such techniques are effective at reducing buffer overflow, they do not alleviate network congestion completely. Another approach is to couple the interconnect device 120 to an external or "out-of-box" memory device for queuing packets during operation. However, this approach requires additional off-chip pins at the interconnect device 120 and silicon-occupying "copper" connections to the external memory device, resulting in additional footprint constraints and scaling limitations. Additional I/O ports at the switch fabric 122 also increases the risk of contention for shared resources in addition to complexities arising from managing traffic flows through the crossbar 124.

Embodiments of the present inventive concepts include an aggregation device for interconnecting a plurality of server nodes. The aggregation device includes a plurality of queues that store data records comprising metadata, header information, and the like corresponding to data payloads transmitted in packets, cells, frames, or related units through a switch fabric of the aggregation device. The queues are constructed and arranged to output the data records to each other in a manner that prevents or reduces problems related to buffer overflow, head of line blocking or other congestion-related issues. A first queue of the arrangement of queues can be referred to as a record queue. The other queues can be referred to as bypass queues. Data is received at the input ports of the switch fabric from one or more server nodes, and/or other electronic devices via a network, and is temporarily stored in a memory at the aggregation device or an external storage device in communication with the aggregation device. A record is generated of the received data and placed into the record queue. The record can include an origin of the data, a destination of the data, and a pointer to the location of the data at the memory. That is, the record queue does not, in the exemplary embodiment, include the data received at the input ports; only a record related to the received data and a pointer to the location of the received data.

The record queue preferably processes data records in a predetermined order, for example, in a first-in first-out (FIFO) order. In an embodiment, the record queue includes a head region where records are output from the record queue, a tail region where records are input to the record queue, and a central region between the head region and the tail region. In the event that the record queue approaches a full state or a predetermined capacity identified by a high threshold point, also referred to as a high water mark, in the queue, the records at the central region can be temporarily transferred to a separate storage device, for example, a memory that also buffers the corresponding data payloads. The records can be returned, in proper order, to the record queue when the record queue has sufficient capacity to receive the removed records. This feature in accordance with embodiments of the present inventive concepts can reduce the risk of an interconnect device experiencing overrun and/or underrun conditions.

Other features can prevent or reduce head-of-line blocking issues. For example, a data record at the head of the record queue may be prevented from output due to an unavailable destination, for example, if an intended destination has insufficient resources to receive the data payload corresponding to the data records. Other records behind this blocked record may likewise be blocked from output, even when destinations are available to receive and process data related to these records. Here, the blocked data record at the head of the record queue can be redirected to one of the bypass queues. In this manner, the record queue is unblocked, and can resume the output of records. The bypass queues can communicate with each other and/or the record queue to output data records previously blocked that become available when the destination device becomes available, whereby the data payload can be retrieved by the processor for output to the destination. Here, the bypass queue storing this data record, and optionally, other data records for the destination, can be prepended to the head of the record queue. A bitmap is provided that includes status or notification bits that are set when records are transferred to a bypass queue for tracking the destination of the records. Subsequent records destined for the same unavailable destination as a blocked record at the head of the queue can likewise be output to the bypass queue according to the bitmap.

If a data record at a head of a first bypass queue is blocked from output, for example, due to unavailable resources at the destination device, then the data record can be moved to a second bypass queue, thereby permitting subsequent data records at the first bypass queue to become unblocked, and output and processed. The second bypass queue can assume the role of the first bypass queue when the first bypass queue is empty. In a similar manner, the second bypass queue can be moved from the second bypass queue to the first bypass queue when data records are determined to block the second bypass queue. Although two output bypass queues are described, other embodiments include three or more output bypass queues constructed and arranged to interact with each other in a similar manner.

Figure 2:
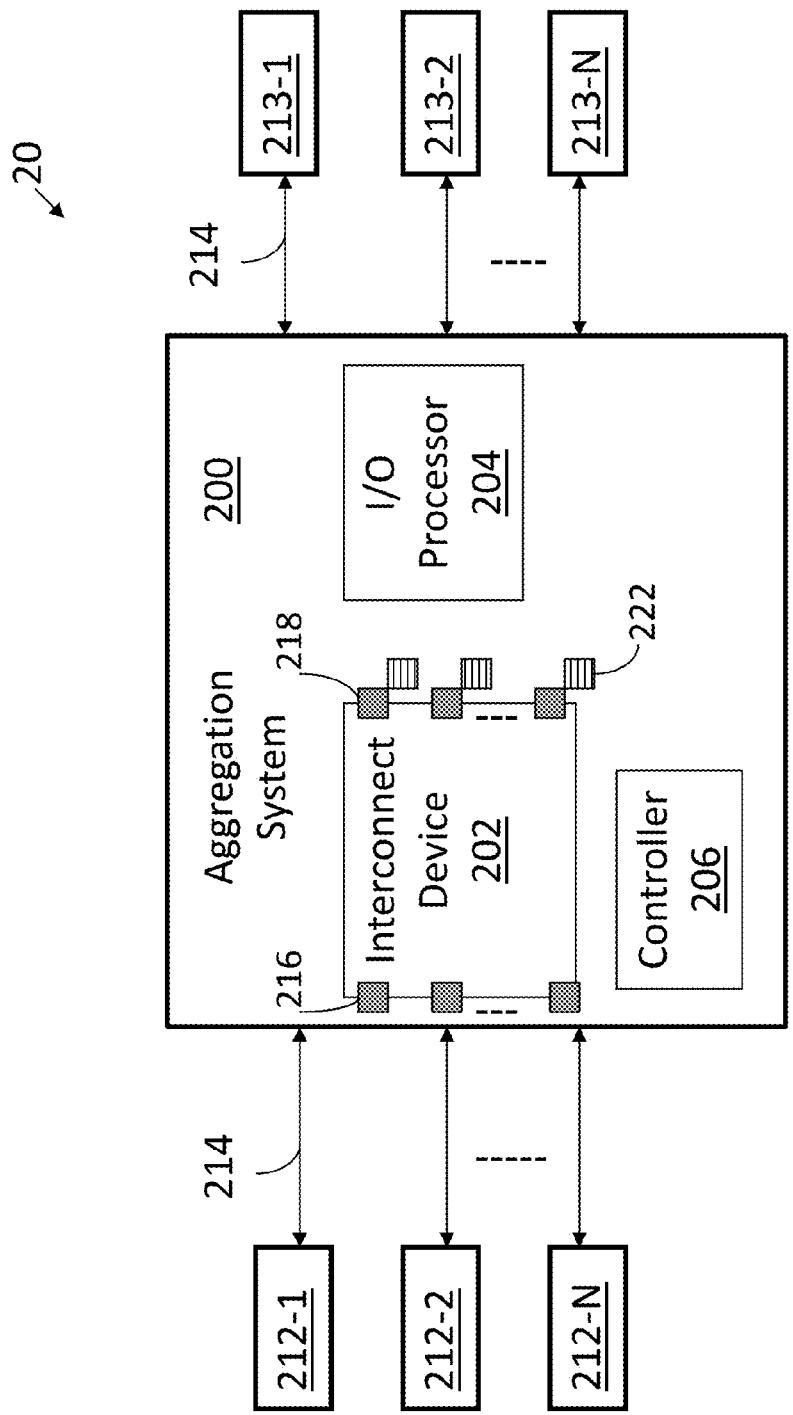
FIG. 2 is a block diagram of a computing infrastructure including a plurality of server nodes in communication with an aggregation system, in accordance with an embodiment.

FIG. 2 is a block diagram of a computing infrastructure 20 including a plurality of server nodes 212-1 through 212-N (generally, 212) and 213-1 through 213-N (generally, 213) in communication with an aggregation system 200, in accordance with an embodiment. The computing infrastructure 20 can include a large-scale data center, cloud computing environment, and the like.

The server nodes 212, 213 can include single socket servers, microservers, processor nodes, or other micro-processor devices known to those of ordinary skill in the art. The server nodes 212, 213 can communicate with the aggregation system 200 over data paths 214 via a PCIe bus or other network connector. The server nodes 212, 213 can be similar to the server nodes 112 described with reference to FIG. 1. The server nodes 212, 213 can include a hypervisor, virtual machines, guest operating systems, and/or related components required for virtualization.

The server nodes 212, 213 can be formed on a different chip or other hardware device than the aggregation system 200, where the aggregation system 200 can include a plurality of package pins or related interfaces and metal interconnects providing the data paths 214 with the server nodes 212, 213 in accordance with PCIe or other communication protocol. Some or all of the aggregation system 200 can be configured at a chip-level, for example, on-die. In another embodiment, the aggregation system 200 and the server nodes 212, 213 are co-located at a same chip or other physical device.

The aggregation system 200 can include an interconnect device 202, an I/O processor 204, and a controller 206. The interconnect device 202 includes a plurality of input ports 216 for receiving data, more specifically, cells, frames, packets, or other units of data arriving via one or more lanes of a data path 214 from one or more server nodes 212, 213, or from a remote device via a NIC (not shown). The interconnect device 202 includes a plurality of output ports 218 for providing data, more specifically, cells, frames, packets, or other units of data received at the input ports 216, to one or more server nodes 212, 213, or to a remote device via a NIC (not shown). Accordingly, the interconnect device 202 can switch data between the input ports 216 and the output ports 218. The input ports 216 and/or the output ports 218 can be unidirectional or bidirectional, i.e., exchange in the input and/or output of data. Thus, the input ports 216 can be constructed and arranged to input and/or output data, and the output ports 218 can likewise be constructed and arranged to input and/or output data. One or more server nodes 212, 213, or other electronic devices, can share, or otherwise be in communication with, a same input port 216 or a same output port 218.

The I/O processor 204 can process data transferred between the interconnect device 202 and the server nodes 212, 213 and/or remote computing devices accessible via a NIC (not shown). The I/O processor 204 can examine incoming data packets directed to a server node 212, 213 via the interconnect device 202 and the like and route them to their destination based on destination address information or other identification fields. The I/O processor 204 can include a packet processor that examines data packets to determine whether they should be filtered or forwarded.

The controller 206 can manage a switching control plane (not shown) for data delivery between the server nodes 212, 213 and the interconnect device 200 by operating network routing protocols, participating in the forwarding of data packets, frames, cells, and the like that are received by the aggregation system 200. The controller 206 can maintain local tables that include classification, forwarding, or routing information, or profiles, rules, or policies regarding data received by the interconnect device 200.

The controller 206 can coordinate a transfer of data at the interconnect device 202, for example, between one or more server nodes 212, 213 and/or external electronic devices, for example, a remote computer via a NIC or related device in communication with the aggregation system 200.

The controller 206 can process data record contents, for example, metadata, header information, or related information, which can be extracted by the interconnect device 202 from data received at the input ports 216. For example, the controller 206 can process a destination address to determine an output port 218 for a data packet received by the aggregation system 200.

The aggregation system 200 can include a plurality of record queues 222 for receiving data records generated by the interconnect device 202 from data received at the input ports 216. In an embodiment, the aggregation system 200 can include one record queue 222 for each output port 218. In another embodiment, the aggregation system 200 can include a record queue 222 for multiple output ports 218 of the interconnect device 202. A record queue 222 is distinguished from a conventional output buffer 128 described with reference to FIG. 1 in that a record queue 222 stores data records, which are significantly smaller than the data payloads stored at the output buffer 128. Data record contents stored at the record queues 222 are determined from data packets, and can include metadata, header information, and the like. A data record can include a source device physical or virtual address and/or a destination physical or virtual address. A data record can include additional information, such as a pointer to a memory location at the switch fabric 306 shown in FIG. 3, where the data payload corresponding to a record can be placed after being received by an input port 216. The controller 206 can process the data corresponding to the records, for example, to determine the location of the data at the interconnect device 202 for retrieving the data. The metadata and the like in the data record can be used to designate a record queue 222 for receiving the record. The data record can include routing hints, for example, related to a state for maintaining legacy protocol transparency. A designated output queue 222 preferably corresponds to the output port 218 identified for outputting the payload corresponding to a received record to its destination, for example, a target server node 212, 213 or an external device via a NIC (not shown). The controller 206 can move records into and/or out of the record queues 222 in accordance with methods described herein.

Figure 3:
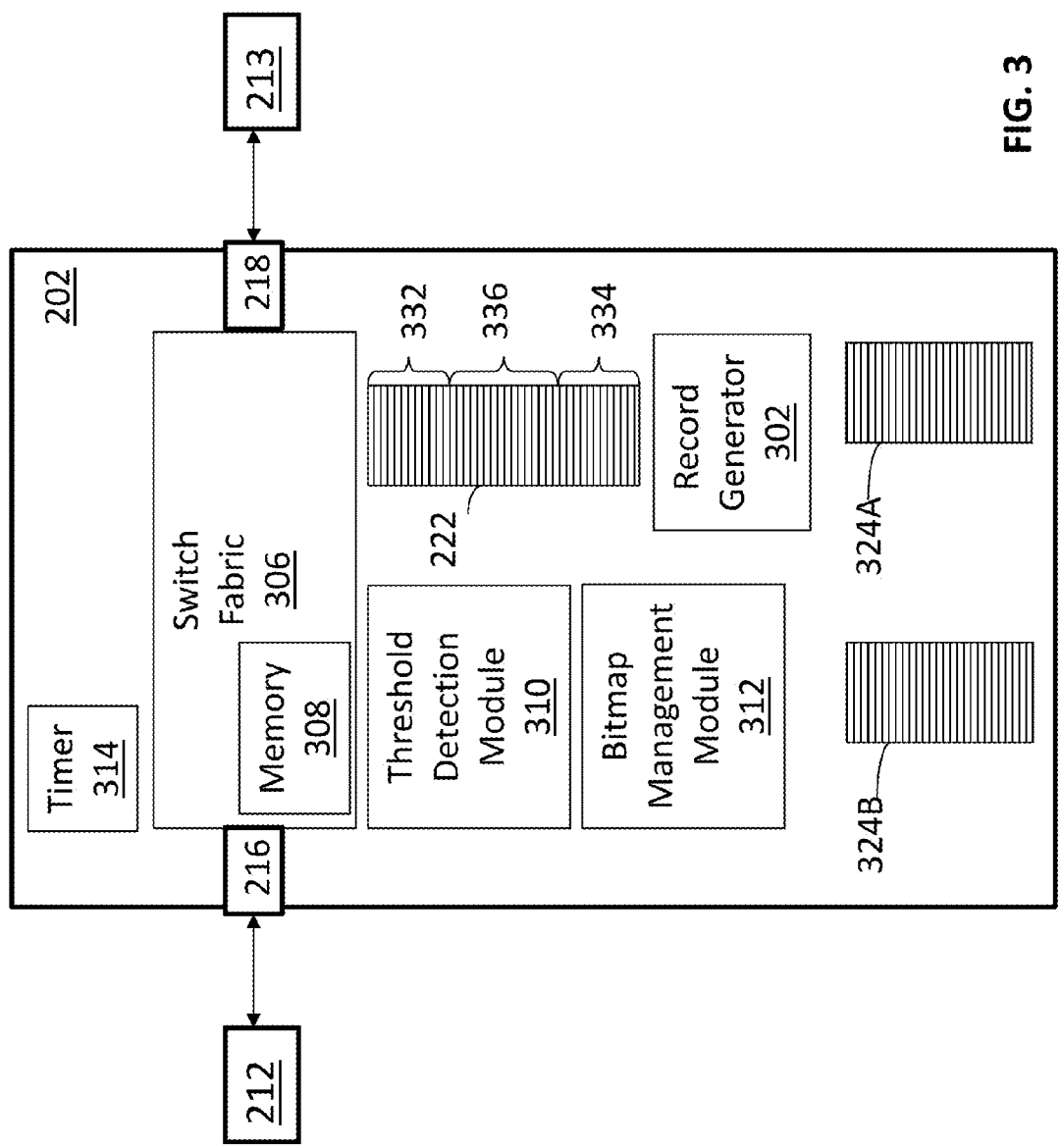
FIG. 3 is a block diagram of an interconnect device, in accordance with an embodiment.

FIG. 3 is a block diagram of an interconnect device 202, in accordance with an embodiment. The interconnect device 202 can be part of the aggregation system 200 described with reference to FIG. 2. The interconnect device 202 can include a record generator 302, a switch fabric 306, a threshold detection module 310, a bitmap management module 312, and a timer 314. In a preferred embodiment, the interconnect device 202 includes at least one record queue 222, and at least one output bypass queue 324A, 324B (generally, 324). Although one record queue 222 and two output bypass queues 324A and 324B are shown, in other embodiments, the interconnect device 202 include any number of record queues 222 and/or output bypass queues 324, for example, a record queue and three output bypass queues.

The record generator 302 can create a record of a unit of data received at an input port 216. The unit of data can be a frame, a cell, a packet, and the like. The record can include metadata or other information related to the source and/or destination of the data. The record can include other relevant information, such as a pointer to the location of the data in a memory 308 at the switch fabric 306. The metadata or other information can be extracted by the record generator 302 from a header or other field of the unit of data.

The switch fabric 306 can exchange data between the input ports 216 and the output ports 218. For example, the switch fabric 306 can receive a data packet via one or more input ports 216 and output the data packet to a destination via one or more output ports 218. The switch fabric 306 can be configured as part of an interposer, a 3D integrated circuit (IC), or related silicon, for communicating with the server nodes 212, 213.

The switch fabric 306 can include crossbars or related switch devices for exchanging data between the input ports 216 and the output ports 218. The switching devices can be in communication with the memory 208, which can include buffers for storing data corresponding to the record data. The memory 308 can store data received from the input ports 216 and provide the stored data to the output ports 218. The switch fabric 124 can include a switching configuration, for example, a crossbar, for moving data between the I/O ports. In another embodiment, the switch fabric 306 can include memory switch, for example, described at U.S. patent application Ser. No. 13/526,973 filed Jun. 19, 2012 entitled "Devices and Methods for Interconnecting Server Nodes" and U.S. patent application Ser. No. 13/529,452 filed Jun. 21, 2012 entitled "Memory Switch for Interconnecting Server Nodes," the contents of each of which is incorporated by reference herein in its entirety.

The record queue 222 can be part of the memory 308, or can be positioned at a separate memory device. The record queue 222 can have a fixed size. Alternatively, the size of the record queue 222 can be variable. The record queue 222 can be constructed and arranged to include a FIFO mechanism, where data is input to a location at the input end of the queue 222 and data in the queue 222 is output from the queue 222 at another location at the output end of the queue 222. The record queue 222 can include a head region 334, a tail region 332, and a central region 336 between the head region and the tail region. Data records are input to the record queue 222 at the tail region 332 and are output from the record queue 222 at the head region 334. Data records at the central region 336 can be moved to the memory 308 in response a high threshold point (shown in FIGS. 5A-5F), also referred to as a capacity threshold or high water mark, detected in the record queue 222, indicating that the record queue 222 is near or at capacity. The timer 314 can be applied to a head of a bypass queue 324.

The record queue 222 can be constructed and arranged to have two logical queues, also referred to as sub-queues, as shown in FIG. 5. The first sub-queue is an input queue, which includes the tail region 332 of the record queue 222. The second sub-queue is an output queue, and includes the head region 334 of the record queue 222. The records at the central region 336 can be removed from the record queue 222 at an output of the logical input queue, and can be returned to the record queue 222. The addition and removal of records at the logical input queue can be managed independently from the addition and removal of records at the logical output queue, for example, shown in FIGS. 4A and 4B.

The threshold detection module 310 can detect a high threshold level and/or a low threshold level at the record queue 222, for example, shown in FIG. 5. The high threshold level can establish that that a fill rate for the record queue 222 exceeds the empty rate of the queue 222, i.e., that records are being input to the record queue 222 at a faster rate than the removal of records from the record queue 222, and that the queue 222 is near or at a predetermined capacity. Here, the controller 206 can remove records from the queue 222 in accordance with the methods described herein.

The low threshold level indicates that the record queue 222 is empty or has an excessively small number of records. The low threshold level can establish that records are being output from the record queue 222 at a faster rate than the input of records to the record queue 222. Here, the threshold detection module 310 can generate a signal indicating that records previously removed during an operation and stored in the memory 308 can be returned to the record queue 222, for example, described at FIGS. 4 and 5. The controller 206 can read a block of memory 308 that stores a record previously removed from the record queue 222, and return the record to the queue 222.

Figure 4A:
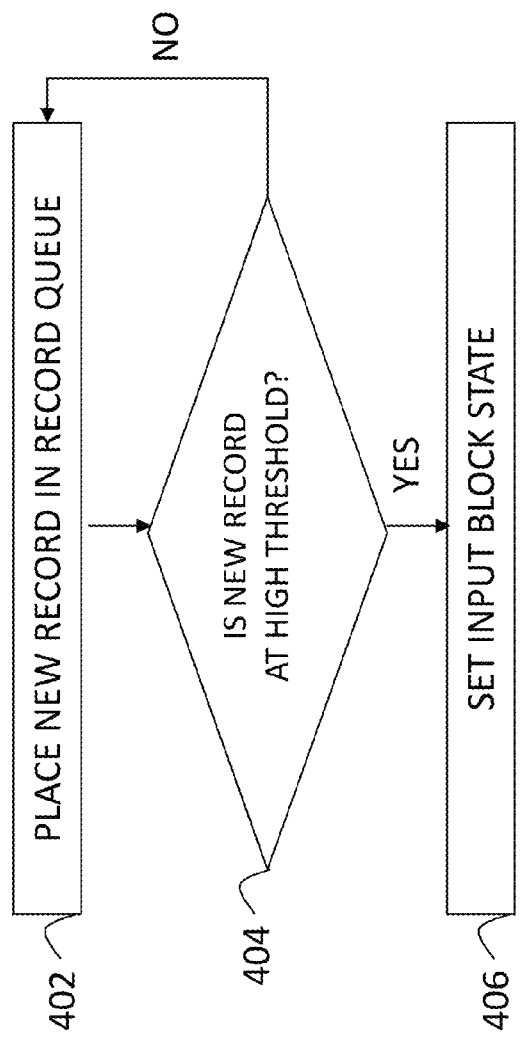
FIGS. 4A and 4B are flow diagrams of methods for transmitting data at an aggregation system, in accordance with embodiments.

FIG. 4A is a flow diagram of a method 400 for transmitting data at an aggregation system, in accordance with embodiments. In describing the method 400, 410, reference is made to the server nodes 212, 213 and the aggregation system 200 described with reference to FIGS. 2 and 3.

At block 402, one or more records are provided to the record queue 222. The records can be created at the record generator 302, which provides the record contents from data packets and the like received at one or more input ports 216. The record generator 302 can obtain information from the data records related to the source and destination of the data, for example, pointers to locations in memory for a data payload.

At decision diamond 404, a determination is made whether the number of records in the record queue 222 exceeds a high threshold level. The high threshold level can be user-defined, or automatically determined, for example, according to the size of the record queue 222. When a new record is received at the record queue 222, the location of the new record is compared to the high threshold level. For example, the threshold detection module 310 can compare a high threshold location at the tail region 334 of the record queue 222 to the location of a received record to determine whether the high threshold level has been reached. If the new record is lower in the queue 222 than the high threshold level, this indicates that the high threshold level is not exceeded, and the method 400 returns to block 402, where new records can be added to the record queue 222. If the new record is at or higher than the high threshold level, this indicates that the record queue 222 is at or close to capacity, and the method 400 proceeds to block 406, where a get block state is set. Here, one or more records at the central region 336 of the record queue 222 are moved to the memory 308, or other data storage device, providing additional locations for subsequently received data records by the record queue 222.

Figure 4B:
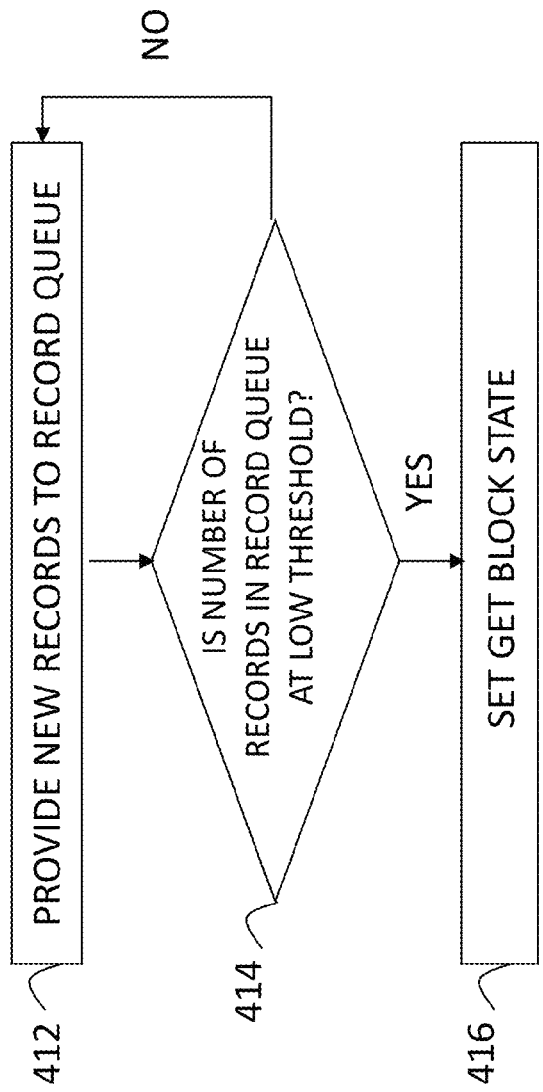

FIG. 4B is a flow diagram of a method 410 for transmitting data at an aggregation system, in accordance with embodiments. In describing the method 410, reference is made to the server nodes 212, 213 and the aggregation system 200 described with reference to FIGS. 2 and 3. The methods 400, 410 can be performed independently of one another. The method 410 can be performed after the method 400 of FIG. 4A.

At block 412, new records can be provided to an input at the tail region 332 of the record queue 222 due to the removal of the records from the central region 336.

At decision diamond 414, a determination is made whether the number of records in the record queue 222 is at or is below a low threshold. The low threshold can be user-defined, or automatically determined according to the size of the record queue 222. When a new record is received at the record queue 222, the threshold detection module 310 can compare a low threshold location at the tail region 334 of the record queue 222 to the location of a received record to determine whether the low threshold has been reached. If the new record is higher in the queue 222 than the low threshold level, this indicates that the number of records in the queue 222 is not lower than the low threshold level, and the method 400 returns to block 412, where new records can be provided to the record queue 222. If the new record is at or below the low threshold level, then the method 400 proceeds to block 416, where a get block state is set. Here, records previously removed at block 406 and stored at the memory 408 or other storage device can be returned to the record queue 222.

Accordingly, the methods 400, 410 in accordance with an embodiment can prevent or reduce the risk of overrun conditions from occurring in a data center or other computing infrastructure environment.

FIGS. 5A-5G are illustrations of a record queue 222 processing data records in various stages of a data transfer operation at an aggregation system, in accordance with an embodiment. In describing the data transfer operation, reference is made to elements of FIGS. 2-4.

As shown at FIG. 5A, a record queue 222 can be constructed and arranged to include a head region 334, a tail region 332, and a central region 336 between the head region and the tail region. The record queue 222 can be constructed and arranged as a ring buffer or the like, where the head region 334 and the tail region 332 are adjacent each other.

Data records can be input to the record queue 222 at the tail region 332 and output from the record queue 222 at the head region 334. The record queue 222 can be further constructed and arranged to include a high threshold level indicator 502 and a low threshold level indicator 504. The high threshold level indicator 502 and/or the low threshold level indicator 504 can be user-configurable, or automatically generated, for example, according to the size of the record queue 222. The high threshold level indicator 502 can be at the tail region 332 of the queue 222, indicating when the record queue 222 is filled, or nearly filled, with data records. The low threshold level indicator 504 can be at the output end of the queue 222, indicating when the record queue 222 is empty, or nearly devoid, of records. The low threshold level indicator 504 can indicate that the record queue 222 is ready to receive data records previously transferred from the queue 222 to an external memory, described herein.

As shown at FIG. 5B, the record queue 222 is populated with data records. Each data record includes information related to a data packet, frame, and the like having a payload that is destined for a destination device via one or more output ports 218 to which the record queue 222 is designated. The information can be in the form of metadata and the like. The information can include pointers to locations in memory for storing the data after receipt at the aggregation system 200. The information can include destination data or other relevant data for transmitting the data to a destination. The data packet can be stored at the memory 308 of the switch fabric 306 until the destination device is available for receiving the data packet. The record queue 222 can receive records until the high threshold level indicator 502 is reached.

In preventing or otherwise reducing a risk of an overflow condition, data records can be removed from the central region 336 of the record queue 222, as shown at FIG. 5C. The removed records can be transferred to a location separate from the record queue 222, for example, stored at memory 308. The records at the central region 336 can be removed from the record queue 222 in response to a determination that the number of records are at or exceed the high threshold level indicator 502.

As shown at FIG. 5D, the record queue 222 can be arranged as a logical representation that includes two sub-queues. The first sub-queue 222A includes the tail region 334 of the record queue 222, for example, at the tail region 332. The second sub-queue 222B is at a bottom region of the record queue 222, and includes the head region 334. New records can be input at the first sub-queue 222A. Original records OR1 in the first sub-queue 222A can be output from the first sub-queue 222A at a location 506, and input to the second sub-queue 222B. Original records OR1 below the region 336 of the removed records OR2 can be referred to as original records OR3. The original records OR3 can be removed from the queue 222. In doing so, the empty queue locations where records OR2 are removed can be maintained between the records OR1 and OR3.

At FIG. 5E, new records are added to the record queue 222 and original records OR3 are removed from the record queue 222. If the fill rate exceeds the empty rate, as shown in FIGS. 5B and 5C, another set of data records OR4 can be removed from the central region 336 of the record queue 222. The removed records OR4 can be transferred to a location separate from the record queue 222, for example, stored at memory 308. The records OR4 at the central region 336, similar to the records OR2, can be removed from the record queue 222 in response to a determination that the number of records are at or exceed the high threshold level indicator 502. A linked list can be generated between the records OR2 and the records OR4, which includes pointers to the memory locations of the records OR2. In an embodiment, a next set of data records can be prewritten to the memory 308, for example, by the controller 306 in anticipation of an allocation of data records to the memory 308.

At FIG. 5F, the original records OR3 are at or below the low threshold indicator 504, indicating that sufficient empty queue locations are available to permit the return of data records OR2 to the record queue 222. This can be achieved by the addition of new records to the queue 222 occurring at a slower rate than the removal of original records OR3 from the queue 222. Accordingly, the high threshold indicator 502 is not triggered; however, the low threshold indicator 504 is triggered. Two logical queues 222A, 222B can be provided in a similar manner as shown in FIG. 5D.

At FIG. 5G, the previously removed records OR2 are returned to the head region 334 of the record queue 222. In this manner, records removed from the central region 336 can be reinserted at the record queue 222 in a proper order when sufficient space becomes available. Although not shown, the removed records OR4 can be subsequently returned to the queue 222 in a similar manner.

Returning to FIG. 3, the bitmap management module 312 of the interconnect device 202 can keep track of data records. A status bit can be provided for each data record to establish whether a data record is at a bypass queue 324.

Figure 6:
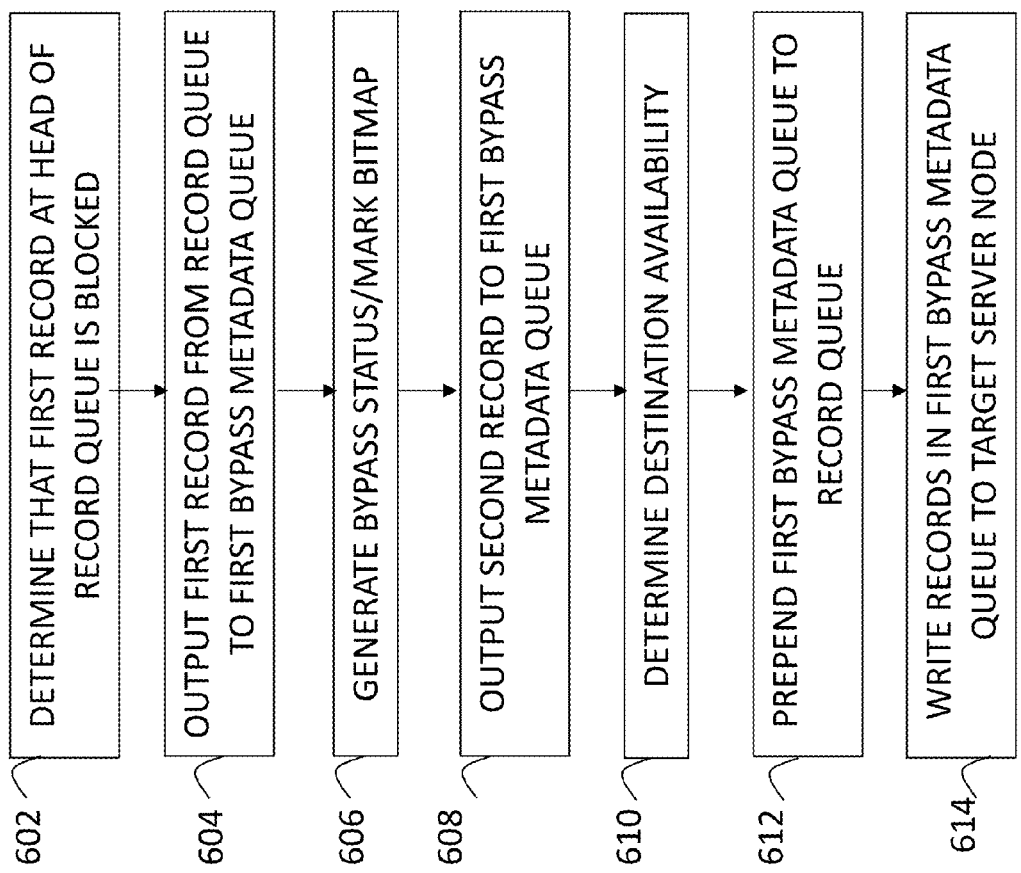
FIG. 6 is a flow diagram of a method for transmitting data at an aggregation system, in accordance with an embodiment.

FIG. 6 is a flow diagram of a method 600 for transmitting data at an aggregation system, in accordance with an embodiment. In describing the method 600, reference is made to the server nodes 212, 213 and the aggregation system 200 described with reference to FIGS. 2-5. Although the server nodes 212, 213 are shown and described, remote electronic devices in communication with the aggregation system 200 can equally apply At block 602, a determination is made that a first record at the output of the record queue 222 is prevented, or blocked, from being output from the record queue 222. This can occur because the destination server node 213 in communication with the output port 218 is unavailable for receiving and processing the data corresponding to the first record. Even though the first record blocks other records in the record queue 222 from being output, the record queue 222 can continue to receive records generated from the data destined for transmission via the output port 218, and thus, the record queue 222 can quickly fill with records. Data corresponding to the records can be stored at the memory 308 of the switch fabric 306 until the port 218 is available.

At block 604, to reduce the risk of an overflow condition at the record queue 222, the first record can be output from the record queue 222 to a first bypass metadata queue 324A. The alleviation of the blockage at the record queue 222 caused by the first record permits other records behind the first record in the record queue 222 to be output from the record queue 222.

At block 606, a bypass status is generated, indicating that the first record is at the first bypass metadata queue 324A. The bypass status can be in the form of a bit having different states, depending on whether records are at a particular bypass metadata queue 324. A bitmap can be marked for tracking the location of records moved between the record queue 222 and the first bypass metadata queue 324A. The bypass status can be maintained by the bitmap management module 312 even when the server node 213 becomes available between the time the first record destined for the server node 213 is moved to the first bypass metadata queue 324A and the time that a subsequent record destined for the same destination, e.g., server node 213, is added to the record queue 222. A bit can be set for each record at the first bypass metadata queue 324A. A bitmap can be provided for each output bypass metadata queue 324A. The bypass status can be used for establishing that all records corresponding to data destined for the destination server node 213 after the first record are moved to the first bypass metadata queue 324A. So long as this bit is set, data records corresponding to data payloads destined for the server node 213 are output to the first bypass metadata queue 324A. Accordingly, at block 608, a second record destined for the server node 213 is output to the first bypass metadata queue 324A according to the set bypass status bit.

At block 610, the availability of the destination is determined. For example, the controller 206 can determine whether the destination server node 213 has sufficient resources to process data received from the switch fabric 306 for example by exchanging messages, descriptors, and the like with the destination server node 213. Here, the destination server node 213 can send a notification that it has available buffers for receiving data from the aggregation system 200. The bitmap management module 312 can be checked to determine if the bit for the destination server node 213 is set or cleared. The bitmap can be cleared when the determination is made that a destination server node 213 is available to receive the bypassed records.

At block 612, the first bypass metadata queue 324A is prepended to the output of the record queue 222. In this manner, the first bypass metadata queue 324A can be reconfigured as an extension to the head region of the record queue 222. Here, data records at the first bypass metadata queue 324A are output to their respective destinations, for example, server node 213-1. Even if another destination node, for example, node 213-2, is available for other data records in the record queue 222 during activation of the first bypass metadata queue 324A, the other destination node 213-2 can wait until the first bypass metadata queue 324A outputs its records for the destination server node 213-1.

At block 614, the first record can be written to a memory at the destination server node 213-1. Other records at the first bypass metadata queue 324A directed at the destination server node 213-1 can likewise be written to the destination server node 213-1. The records in the bypass metadata queue 324A can be cleared from the first bypass metadata queue 324A. When the first bypass metadata queue 324A is emptied, for example, all records at the first bypass metadata queue 324A are output, the record queue 222 can return to a previous state, where records are not output to the prepended first bypass metadata queue 324A, but are instead output for processing by one or more destination nodes 213 identified by the records output from the record queue 222.

Figure 7:
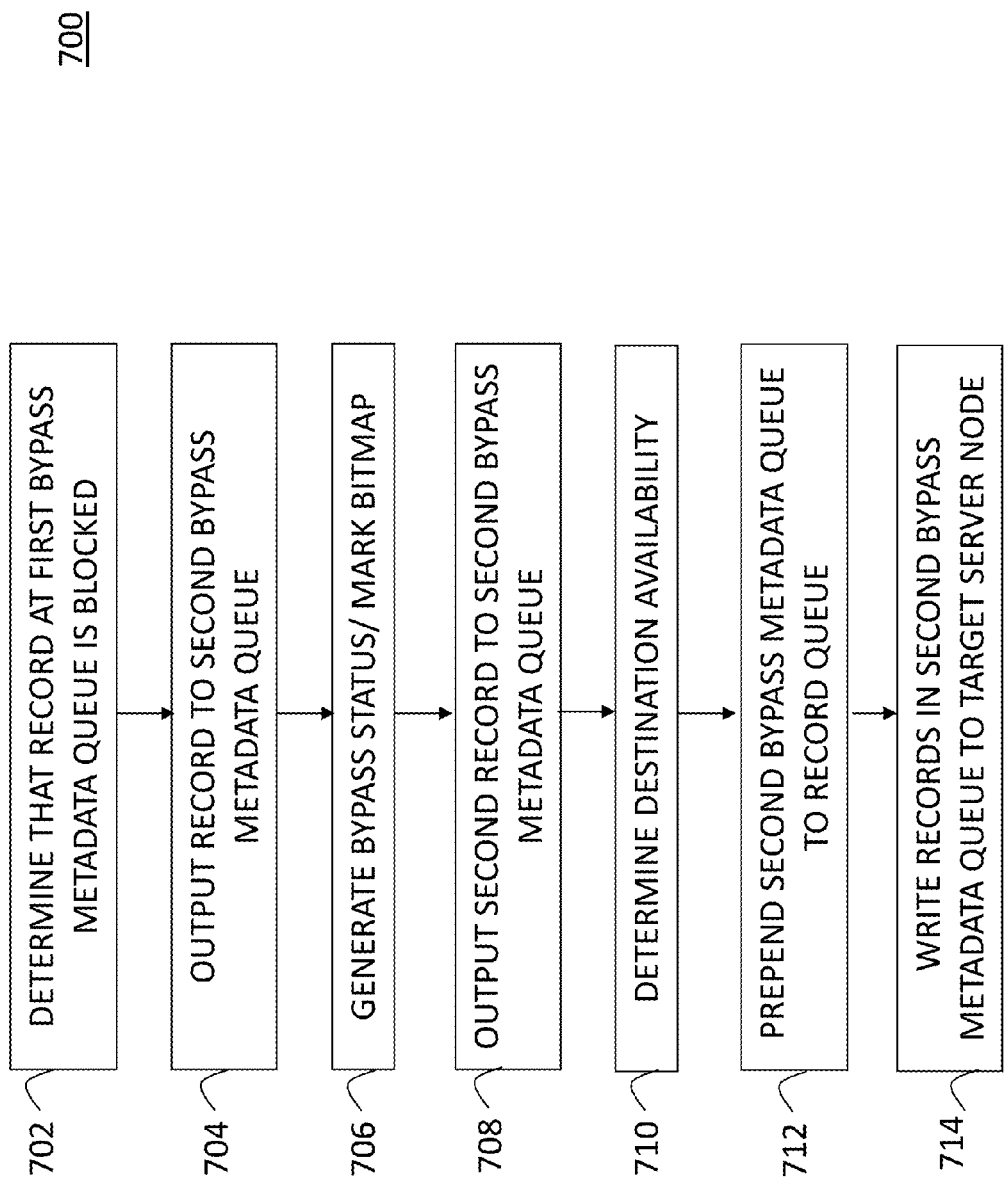
FIG. 7 is a flow diagram of a method for transmitting data between bypass metadata queues and a record queue, in accordance with an embodiment.

FIG. 7 is a flow diagram of a method 700 for transmitting data between output bypass queues and a record queue, in accordance with an embodiment. In describing the method 700, reference is made to the server nodes 212, 213 and the aggregation system 200 described with reference to FIGS. 2 and 3. Although the server nodes 212, 213 are shown and described, remote electronic devices in communication with the aggregation system 200 can equally apply. The method 700 is preferably performed when the first bypass metadata queue 324A is active, and when one or more records are in the first bypass metadata queue 324A.

At step 702, a determination is made that a record at an output of the first bypass metadata queue 324A is prevented, or blocked, from being output from the first bypass metadata queue 324A. This can occur for reasons similar to those described at step 602, e.g., because the destination server node 213 in communication with the output port 218 is unavailable for receiving and processing the data corresponding to the record.

At block 704, the blocked record is output from the first bypass metadata queue 324A to a second bypass metadata queue 324B. The alleviation of the blockage at the record queue 324A permits records behind the blocked record in the first bypass metadata queue 324A to be subsequently output from the record queue 222.

At block 706, a bypass status is generated, indicating that the record is at the second bypass metadata queue 324B. The bypass status can be maintained by the bitmap management module 312 even when the server node 213 becomes available between the time the first record destined for the server node 213 is moved to the second bypass metadata queue 324B and the time that a subsequent record destined for the same destination, e.g., server node 213, is added to the first bypass metadata queue 324A. The bitmap status can be a bit generated by the bitmap management module 312 set for each record at the second bypass metadata queue 324B. The bypass status bit is also important because all records corresponding to data destined for the destination server node 213 after the record are likewise moved to the second bypass metadata queue 324B. So long as this bit is set, data records corresponding to data payloads destined for the server node 213 are output to the second bypass metadata queue 324B. Accordingly, at block 708, a second record destined for the server node 213 is output to the second bypass metadata queue 324B according to the set bypass status bit.

At block 710, the destination of the data corresponding to the blocked records is determined to be available. For example, the controller 206 can establish that the destination server node 213 has sufficient resources to process data received from the switch fabric 306 by exchanging messages, descriptors, and the like with the destination server node 213. During such an exchange, the destination server node 213 can send a notification that it has available buffers for receiving data from the aggregation system 200. The bitmap management module 312 can determine if the bit for the destination server node 213 is set. As described above, the bit indicates that the record is in the second bypass metadata queue 324B and has not been sent to the destination server node 213. The bit can be set when the first bypass metadata queue 324A is emptied of records.

At block 712, the bitmap can be cleared when the determination is made that a destination server node 213 is available to receive at least one bypassed record. The second bypass metadata queue 324B is prepended to the output of the record queue 222. The first bypass metadata queue 324A is removed from the record queue 222. In an embodiment, the roles of the first and second bypass metadata queues 324A, 324B described in at least block 704 can be reversed, namely, a blocked record at the second bypass metadata queue 324B, now prepended to the record queue 222, can be output from the second bypass metadata queue 324B to the first bypass metadata queue 324A.

At block 714, the record originally blocked at the first output bypass queue 324A and subsequently moved to the second output bypass queue 324B can be written to a memory at the destination server node 213-1 in response to a determination that the destination server node 213-1 has sufficient resources to receive and process data. Other records at the second bypass metadata queue 324B directed at the destination server node 213-1 can likewise be written to the destination server node 213-1. In this manner, the records in the bypass metadata queue 324A are cleared from the second bypass metadata queue 324A. When the second bypass metadata queue 324B is emptied, for example, all records at the second bypass metadata queue 324B are output, other records can be output from the record queue 222 for processing.

Method 700 describes the interaction between two bypass metadata queues. In other embodiments, method 700 can apply to any number of bypass metadata queues. For example, in another embodiment, a third bypass metadata queue (not shown) is provided if a record at the second bypass metadata queue is blocked. Here, the blocked record can be output to the third bypass metadata queue, which can be prepended to the record queue when the destination of the blocked record becomes available, where one or more steps of method 700 can be applied.

Figure 8:
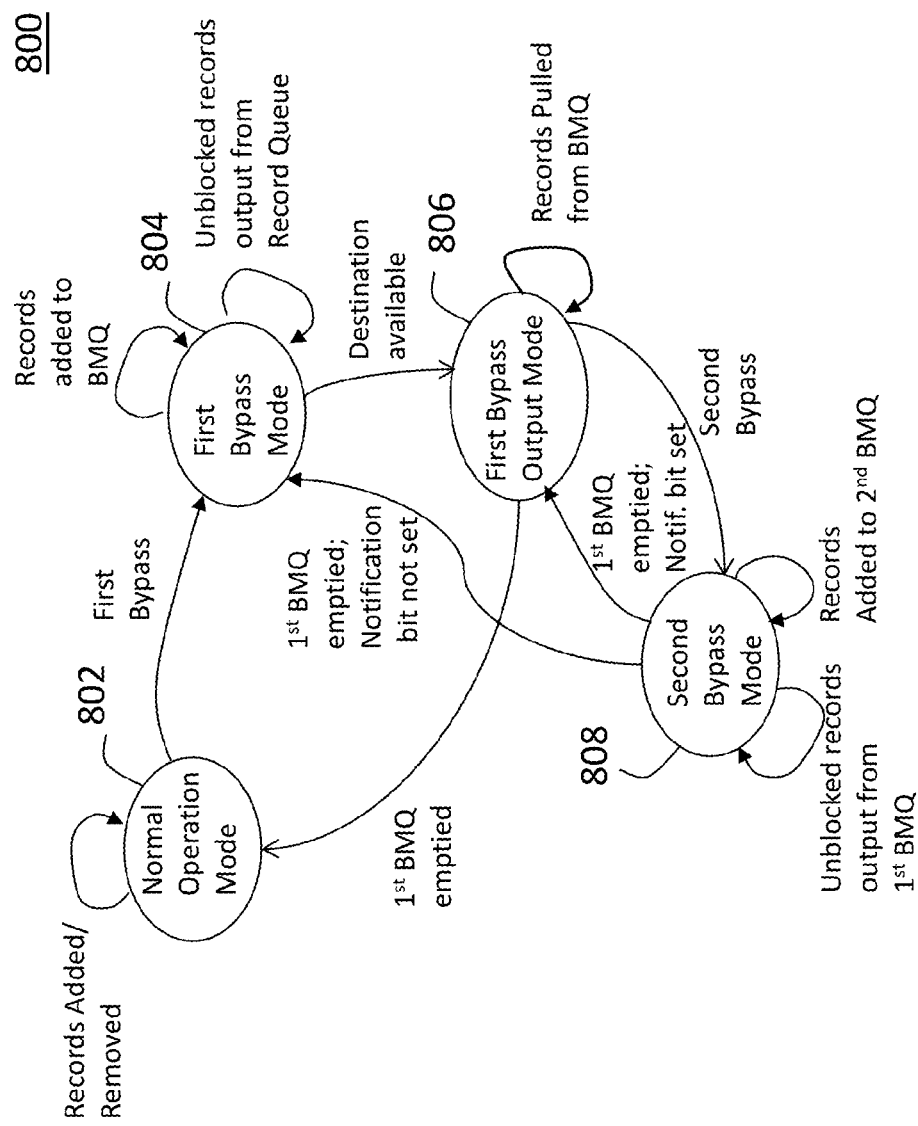
FIG. 8 is a state diagram illustrating operating states of an aggregation system, in accordance with an embodiment.

FIG. 8 is a state diagram 800 that illustrates operating states of an aggregation system, in accordance with an embodiment. In describing the state diagram 800, reference is made to elements of FIGS. 2-7.

At state 802, the aggregation system 200 is in a normal mode of operation. Here, records can be added to and/or removed from the record queue 222. In an embodiment, the record queue 222 operates according to the method 400 described herein.

At state 804, the aggregation system 200 is in a first bypass mode of operation. The transition to state 804 can occur when a record at the head 334 of the record queue 222 cannot be processed because the destination of the record, for example, destination node 213-1, has insufficient resources. This record and/or other records identified for output to the destination node 213-1 are queued at a bypass metadata queue, for example, the first bypass metadata queue 324A. Alternatively, records can be queued at the second bypass metadata queue 324. Other records targeted for other destinations in the record queue can be output from the record queue 222 due to the removal of the blocked records to the first bypass metadata queue 324A. A bit can be set that corresponds to the blocked output port, for tracking purposes as described herein. The bit can provide a virtual notification that data can be forwarded from a queue to another location.

At state 806, the aggregation system 200 is in a first bypass output mode. Here, the destination server node 213-1 is available for receiving data, for example, sufficient resources are available at the destination server node 213-1 for receiving and processing the data related to the record in the first bypass metadata queue 324-A. The bitmap can be cleared indicating that it is available for use by another bypass metadata queue, for example, the second bypass metadata queue 324B. The clearing of the bitmap can also indicate that the first bypass metadata queue 324A is no longer receiving records targeted for the server node 213-1 from the record queue 222. The first bypass metadata queue 324A can be prepended to the head region 334 of the record queue 222. The previously blocked records in the first bypass metadata queue 324A can be output from the prepended first bypass metadata queue 324A to the destination server node 213-1. When the first bypass metadata queue 324A is emptied, i.e., devoid of records, the aggregation system 200 can transition from state 806 to state 802, where records in the record queue 222 are output in accordance with the normal operation mode.

If a determination is made at state 806 that a record at the head of the first bypass metadata queue 324A cannot be processed, the aggregation system 200 can transition to a second bypass mode of operation at state 808. At state 808, the blocked record at the head of the first bypass metadata queue 324A can be output to the second bypass metadata queue ($2^{nd}$ BMQ) 324B. Other records identified for output to the same destination node, e.g., node 213-1, as the blocked record at the head of the first bypass metadata queue 324A can be likewise added to the second bypass metadata queue 324B. A bit can be set that corresponds to the blocked output port, for tracking purposes as described herein. Other records in the first bypass metadata queue 324A targeted for available destinations can be output from the first bypass metadata queue 324A due to the removal of the blocked records at the head of the first bypass metadata queue 324A.

The aggregation system 200 can transition from state 808 to state 806 in response to a determination that the first bypass metadata queue 324A is emptied, i.e., devoid of records. Here, a notification bit indicates that resources are available at a destination node for data corresponding to one or more records in the second bypass queue 324B. At state 806, a destination server node 213 corresponding to a blocked record at the head of the second bypass metadata queue 324B can be determined to be available for receiving data. The bitmap can be cleared indicating that it is available for use by another bypass metadata queue, for example, the first bypass metadata queue 324A. The second bypass metadata queue 324B can be prepended to the head region 334 of the record queue 222. The previously blocked records in the second bypass metadata queue 324B can be output from the prepended second bypass metadata queue 324B.

The aggregation system 200 can transition from state 808 to state 804 in response to a determination that the first bypass metadata queue 324A is emptied, i.e., devoid of records. Here, a notification bit is not set, indicating that resources are not available at a destination node for data corresponding to one or more records in the second bypass queue 324B. At state 804, a record and/or other records identified for output to a destination node 213 are queued at the second bypass metadata queue 324B. A bit can be set that corresponds to the blocked output port, for tracking purposes as described herein. The bit can provide a virtual notification that data can be forwarded from a queue to another location.

As described above, one or more of the methods described herein can be applied to a virtualized environment, where a source server node 212 and/or a destination server node 213 is constructed and arranged to include a plurality of virtual machines, guest operating systems, and related elements required for virtualization. Accordingly, a plurality of virtual machines can execute at one or more processors of a server node 212, 213. Here, one or more buffers can be created for input data, which can be posted at the interconnect device 202. However, the virtual machine corresponding to the posted buffers may become inactive, for example, swapped out due to other processes executing at the processor. As the buffers are consumed, the high threshold level indicator 502 can be triggered, whereby some or all of the methods described with reference to FIGS. 4-8 can be performed. This is particular beneficial since an interrupt may be provided to the server node processor, requesting more buffers. However, since the virtual machine corresponding to the consumed buffers is inactive. When the virtual machine is reactivated, the virtual machine will post additional buffers. The methods described with reference to FIGS. 4-8, when performed, can be applied to prevent buffer overruns or underruns that may otherwise occur.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ and the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A computer-implemented method for transmitting data at an aggregation device, comprising:
   receiving, at the aggregation device, data from an electronic device;
   placing a record of the received data in a record queue; and
   responsive to the record queue is at or higher than a first threshold, outputting a plurality of other records from locations in the record queue to a memory whereby a number of available locations at the record queue is increased; and
   responsive to a number of records in the record queue is at or lower than a second threshold, transferring the other records to the record queue, the computer-implemented method further comprising:
   dividing the record queue into two sub-queues that operate independently of each other, each sub-queue having an input and an output, the first sub-queue including an indicator of the first threshold, the second sub-queue including an indicator of the second threshold.

2. The computer-implemented method of claim 1, further comprising:
   transferring the other records from the memory to the input of the second sub-queue in response to a number of records in the second sub-queue is at or lower than the second threshold and in response to a number of records in the first sub-queue is at or lower than the first threshold.

3. The computer-implemented method of claim 1, wherein the record includes metadata indicating at least one of an origin of the data, a current location of the data at the interconnect device, and a destination of the data.

4. The computer-implemented method of claim 1, further comprising:
   constructing and arranging the record queue to include a head region, a tail region, and a central region between the head region and the tail region, wherein first data records are input to the tail region, wherein second data records are output from the head region, and wherein third data records in the central region between the first and second data records are transferred to the memory from the central region.

5. The computer-implemented method of claim 4, further comprising:
   inputting the first data records to the tail region;
   determining that a fill rate of the first data records to the tail region is less than an empty rate of the third data records from the head region; and
   transferring the third data records from the memory to the record queue.

6. The computer-implemented method of claim 1, further comprising:
   determining that the record in the record queue is blocked; and
   transferring the blocked record from the record queue to a first output bypass queue.

7. The computer-implemented method of claim 6, wherein determining that the record in the record queue is blocked includes determining that a destination electronic device has insufficient resources to receive and process the data.

8. The computer-implemented method of claim 7, further comprising:
   generating a bypass status indicating that the record is at the first output bypass queue.

9. The computer-implemented method of claim 8, further comprising:
   determining that the destination electronic device has sufficient resources to receive and process the data;
   clearing the bypass status;
   prepending the first output bypass queue to the record queue; and
   outputting one or more records from the first output bypass queue.

10. The computer-implemented method of claim 1, wherein the record queue is in communication with at least one of an input port and an output port of the aggregation device.

11. The computer-implemented method of claim 1, wherein the record queue is linked with one or more other record queues for exchanging records with the other record queues.

12. A computer-implemented method for transmitting data at an aggregation device, comprising:
   receiving data from an electronic device in communication with the aggregation device;
   generating a record of the received data;
   placing a record of the received data in a record queue;
   responsive to the record queue is blocked transferring the blocked record from the record queue to an output bypass queue; and
   generating a bypass status at a bitmap indicating that the record is at the output bypass queue.

13. The computer-implemented method of claim 12, further comprising determining that the record in the record queue is blocked, including determining that a destination electronic device has insufficient resources to receive and process the data.

14. The computer-implemented method of claim 12, wherein the record includes metadata indicating at least one of an origin of the data, a current location of the data at the interconnect device, and a destination of the data.

15. The computer-implemented method of claim 12, further comprising:

determining that the destination electronic device has sufficient resources to receive and process the data;
clearing the bitmap; and
prepending the output bypass queue to the record queue; and
outputting one or more records from the output bypass queue.

16. The computer-implemented method of claim 12, further comprising:
determining that a record at a head of the output bypass queue is blocked; and
transferring the blocked record from the output bypass queue to another output bypass queue.

17. The computer-implemented method of claim 16, further comprising:
generating a bypass status at a bitmap indicating that the record is at the other output bypass queue;
determining that the destination electronic device has sufficient resources to receive and process the data;
determining that the output bypass queue is devoid of records clearing the bitmap;
prepending the other output bypass queue to the record queue; and
outputting one or more records from the other output bypass queue.

18. The computer-implemented method of claim 16, further comprising:
constructing and arranging the record queue to include a head region, a tail region, and a central region between the head region and the tail region, wherein first data records are input to the tail region, wherein second data records are output from the head region, and wherein third data records in the central region between the first and second data records are transferred to the memory from the central region.

19. The computer-implemented method of claim 18, further comprising:
inputting the first data records to the tail region;
determining that a fill rate of the first data records to the tail region is less than an empty rate of the third data records from the head region; and
transferring the third data records from the memory to the record queue.

20. An aggregation device that interconnects at least two server nodes, comprising:
a record queue to temporarily stores a plurality of records generated from data received at the aggregation device from a source server node of the at least two server nodes prior to an output of the data to a destination server node of the at least two server nodes; and
at least one output bypass queue that temporarily stores records that are blocked from output to the destination server node,
wherein the aggregation device divides the record queue to include a head region, a tail region, and a central region between the head region and the tail region, wherein first data records are input to the tail region, wherein second data records are output from the head region, and wherein third data records in the central region between the first and second data records are transferred to the memory from the central region in response to the threshold detection module determining that the record in the record queue is at or higher than the first threshold, wherein the threshold detection module determines that a fill rate of the first data records to the tail region is less than an empty rate of the third data records from the head region, and wherein the third data records are transferred from the memory to the record queue.

21. The aggregation device of claim 20, further comprising:
a switch fabric;
a plurality of input ports at the input of the switch fabric;
a plurality of output ports at the output of the switch fabric; and
a record generator that generates a record of a unit of data received at an input port of the plurality of input ports.

22. The aggregation device of claim 21, further comprising a threshold detection module that determines when a record in the record queue is at or higher than a first threshold or is at or lower than a second threshold, wherein records are removed from the record queue in response to the threshold detection module determining that a number of records in the record queue is at or higher than the first threshold, and wherein the records are returned to the record queue in response to the threshold detection module determining that a number of records in the record queue is at or lower than the second threshold.

23. The aggregation device of claim 22, wherein the aggregation device divides the record queue into two sub-queues that operate independently of each other, each sub-queue having an input and an output, the first sub-queue including an indicator of the first threshold, the second sub-queue including an indicator of the second threshold.

24. The aggregation device of claim 20, further comprising a bitmap management module that maintains a bitmap comprising a status bit for each record, the status bit establishing whether a record is at the at least one output bypass queue.

25. The aggregation device of claim 24, wherein the bitmap management module clears the bitmap in response to determining that the destination server node has resources to process the data.

26. The aggregation device of claim 25, wherein the at least one output bypass queue includes a first output bypass queue and a second output bypass queue, and wherein a record is transferred from the first output bypass queue to the second output bypass queue in response to a determination that the record is blocked.

27. The aggregation device of claim 26, wherein the bitmap management module generates a status bit indicating that the record is in the second output bypass queue.

28. The aggregation device of claim 27, wherein the aggregation device prepends the second output bypass queue to the record queue and clears the bitmap in response to a determination that the destination server node has resources to process data related to the record in the second output bypass queue and that the first output bypass queue is devoid of records.

29. A computer-implemented method for transmitting data at an aggregation device, comprising:
receiving, at the aggregation device, data from an electronic device;
placing a record of the received data in a record queue;
responsive to the record queue is at or higher than a first threshold, outputting a plurality of other records from locations in the record queue to a memory whereby a number of available locations at the record queue is increased;
constructing and arranging the record queue to include a head region, a tail region, and a central region between the head region and the tail region, wherein first data records are input to the tail region, wherein second data records are output from the head region, and wherein third data records in the central region between the first and second data records are transferred to the memory from the central region;

inputting the first data records to the tail region;

determining that a fill rate of the first data records to the tail region is less than an empty rate of the third data records from the head region; and transferring the third data records from the memory to the record queue.

30. A computer-implemented method for transmitting data at an aggregation device, comprising:

receiving, at the aggregation device, data from an electronic device;

placing a record of the received data in a record queue;

responsive to the record queue is at or higher than a first threshold, outputting a plurality of other records from locations in the record queue to a memory whereby a number of available locations at the record queue is increased;

determining that the record in the record queue is blocked, wherein determining that the record in the record queue is blocked includes determining that a destination electronic device has insufficient resources to receive and process the data;

transferring the blocked record from the record queue to a first output bypass queue; and generating a bypass status indicating that the record is at the first output bypass queue.

31. A computer-implemented method for transmitting data at an aggregation device, comprising:

receiving data from an electronic device in communication with the aggregation device;

generating a record of the received data;

placing a record of the received data in a record queue;

responsive to the record queue is blocked transferring the blocked record from the record queue to an output bypass queue;

determining that a record at a head of the output bypass queue is blocked;

transferring the blocked record from the output bypass queue to another output bypass queue;

generating a bypass status at a bitmap indicating that the record is at the other output bypass queue;

determining that the destination electronic device has sufficient resources to receive and process the data;

determining that the output bypass queue is devoid of records clearing the bitmap;

prepending the other output bypass queue to the record queue; and outputting one or more records from the other output bypass queue.

32. A computer-implemented method for transmitting data at an aggregation device, comprising:

receiving data from an electronic device in communication with the aggregation device;

generating a record of the received data;

placing a record of the received data in a record queue;

responsive to the record queue is blocked transferring the blocked record from the record queue to an output bypass queue;

constructing and arranging the record queue to include a head region, a tail region, and a central region between the head region and the tail region, wherein first data records are input to the tail region, wherein second data records are output from the head region, and wherein third data records in the central region between the first and second data records are transferred to the memory from the central region;

inputting the first data records to the tail region;

determining that a fill rate of the first data records to the tail region is less than an empty rate of the third data records from the head region; and transferring the third data records from the memory to the record queue.

33. An aggregation device that interconnects at least two server nodes, comprising:

a record queue to temporarily stores a plurality of records generated from data received at the aggregation device from a source server node of the at least two server nodes prior to an output of the data to a destination server node of the at least two server nodes;

at least one output bypass queue that temporarily stores records that are blocked from output to the destination server node, and a bitmap management module that maintains a bitmap comprising a status bit for each record, the status bit establishing whether a record is at the at least one output bypass queue.

* * * * *